United States Patent
Lee et al.

(10) Patent No.: US 12,112,591 B2
(45) Date of Patent: Oct. 8, 2024

(54) AI-BASED NOISE GENERATION DIAGNOSIS APPARATUS AND METHOD OF PE COMPONENTS FOR ELECTRIC VEHICLE

(71) Applicants: Hyundai Motor Company, Seoul (KR); Kia Corporation, Seoul (KR)

(72) Inventors: Dong-Chul Lee, Gyeonggi-do (KR); In-Soo Jung, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 274 days.

(21) Appl. No.: 17/869,478

(22) Filed: Jul. 20, 2022

(65) Prior Publication Data
US 2023/0260341 A1 Aug. 17, 2023

(30) Foreign Application Priority Data
Feb. 11, 2022 (KR) .................. 10-2022-0017867

(51) Int. Cl.
- *G07C 5/08* (2006.01)
- *G01H 3/12* (2006.01)
- *G10K 11/26* (2006.01)

(52) U.S. Cl.
CPC .......... *G07C 5/0833* (2013.01); *G01H 3/125* (2013.01); *G10K 11/26* (2013.01); *B60W 2420/54* (2013.01)

(58) Field of Classification Search
None
See application file for complete search history.

(56) References Cited

U.S. PATENT DOCUMENTS

| | | | |
|---|---|---|---|
| 11,361,782 B2 * | 6/2022 | Ninomiya | G10L 25/18 |
| 2021/0366210 A1 * | 11/2021 | Okuda | G07C 5/006 |
| 2021/0390137 A1 * | 12/2021 | Feldman | G06N 3/08 |
| 2022/0194383 A1 * | 6/2022 | Tabata | B60W 40/02 |
| 2022/0198845 A1 * | 6/2022 | Tabata | G07C 5/008 |

FOREIGN PATENT DOCUMENTS

KR 2020-0075148 A 6/2020

OTHER PUBLICATIONS

Orman et al., "Usage of acoustic camera for condition monitoring of electric motors," IEEE International Conference of IEEE Region 10 (TENCON 2013), Oct. 2013, pp. 1-4. (Year: 2013).*

* cited by examiner

*Primary Examiner* — Todd Melton
(74) *Attorney, Agent, or Firm* — Fox Rothschild LLP

(57) ABSTRACT

Embodiments of the present disclosure relate to an AI-based noise generation diagnosis apparatus and method of diagnosing noise of PE components for an electric vehicle, in which a plurality of microphones are disposed in a vehicle interior, and a calculation unit measures positions of noise sources from any one or more among the PE components comprising a main motor, a decelerator, an inverter, and an auxiliary motor from front, rear, and upward directions of the microphone, and at the same time, estimates a noise transmission position where the noise is transmitted.

14 Claims, 4 Drawing Sheets

AI-BASED NOISE GENERATION DIAGNOSIS APPARATUS AND METHOD OF PE COMPONENTS FOR ELECTRIC VEHICLE

CROSS-REFERENCE TO RELATED APPLICATION

This application is based on and claims benefits of Korean Patent Application No. 10-2022-0017867, filed on Feb. 11, 2022, which is incorporated herein by reference in its entirety.

TECHNICAL FIELD

Embodiments of the present disclosure relate to the diagnosis of a noise generation abnormal state by applying a deep learning technique to the noise diagnosis of main PE components constituting a power electric (PE) system for an electric vehicle.

DESCRIPTION OF RELATED ART

When the high-frequency whine noise is generated from a motor, a decelerator, and an inverter, which are PE components for an electric vehicle, quality problem from a customer occurs. To diagnose the high-frequency whine noise, it is possible to estimate a position by using measurement equipment such as an acoustic camera while performing evaluation and test by a group of experts. However, since the acoustic camera may only estimate a two-dimensional (2D) region of a specific frequency band, and the acoustic camera is not applied to a microphone specialized for the electric vehicle, it is impossible to diagnose an abnormal state of the PE components for the electric vehicle, and it is possible to only estimate a sound absorbing and blocking leak region mainly in a vehicle interior.

Therefore, to implement the acoustic camera applicable to a three-dimensional region, there is a need for a noise generation diagnosis apparatus and method for the power electric (PE) components for the electric vehicle, which may perform failure diagnosis and estimate a failure position by using a microphone.

SUMMARY OF THE DISCLOSURE

An object of embodiments of the present disclosure is to provide an abnormal state diagnosis apparatus and method by applying a deep learning technique to high-frequency whine noise of main PE components constituting an electric vehicle.

Embodiments of the present disclosure for achieving the object relate to an apparatus for diagnosing the noise generated from PE components for an electric vehicle including a main motor, a decelerator, and an inverter positioned in a rear trunk, and an auxiliary motor positioned in a front motor room, that is, noise sources. Embodiments of the present disclosure relate to an AI-based noise generation diagnosis apparatus of PE components for an electric vehicle including: a plurality of microphones disposed in a vehicle interior, and a calculation unit collecting and calculating noise data measured by the microphone, in which not only the microphone estimates a noise generation position from noise data generated by any one or more noise sources among the main motor, the decelerator, the inverter, and the auxiliary motor, but also the calculation unit calculates an artificial intelligence model estimating a noise transmission position where the noise is transmitted into the vehicle interior from the noise source.

In addition, embodiments of the present disclosure relate to an AI-based noise generation diagnosis method of PE components for an electric vehicle, as the method for diagnosing noise generated from the PE components (i.e., noise sources) for the electric vehicle including a main motor, a decelerator, and an inverter positioned in a rear trunk, and an auxiliary motor positioned in a front motor room, the method including: collecting noise data from front, rear, and upward directions by a plurality of microphones disposed in a vehicle interior (S10), extracting a feature vector for the noise data and preparing a data set labeled through data labeling (S20), performing, by a calculation unit, learning of a noise generation diagnosis model according to failure for each type from the extracted feature vector and the labeled data set (S30), additionally performing, by the calculation unit, learning estimating a noise transmission position in addition to the noise generation diagnosis model (S40), and visualizing the noise generation position and the noise transmission position from image data acquired by a camera positioned in the front and rear directions together with the microphone (S50).

As discussed, the method and apparatus suitably include use of a controller or processer.

In another aspect, vehicles are provided that comprise an apparatus as disclosed herein.

DESCRIPTION OF SPECIFIC EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, and the like, and includes hybrid vehicles, electric vehicles, plug-in hybrid electric vehicles. As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation and can be implemented by hardware components or software components and combinations thereof.

Further, the control logic of embodiments of the present disclosure may be embodied as non-transitory computer readable media on a computer readable medium containing executable program instructions executed by a processor, controller, or the like. Examples of computer readable media include, but are not limited to, ROM, RAM, compact disc (CD)-ROMs, magnetic tapes, floppy disks, flash drives, smart cards, and optical data storage devices. The computer readable medium can also be distributed in network coupled computer systems so that the computer readable media is stored and executed in a distributed fashion, e.g., by a telematics server or a Controller Area Network (CAN).

Detailed contents for implementing embodiments of the present disclosure will be described with the drawings.

Figure 1:
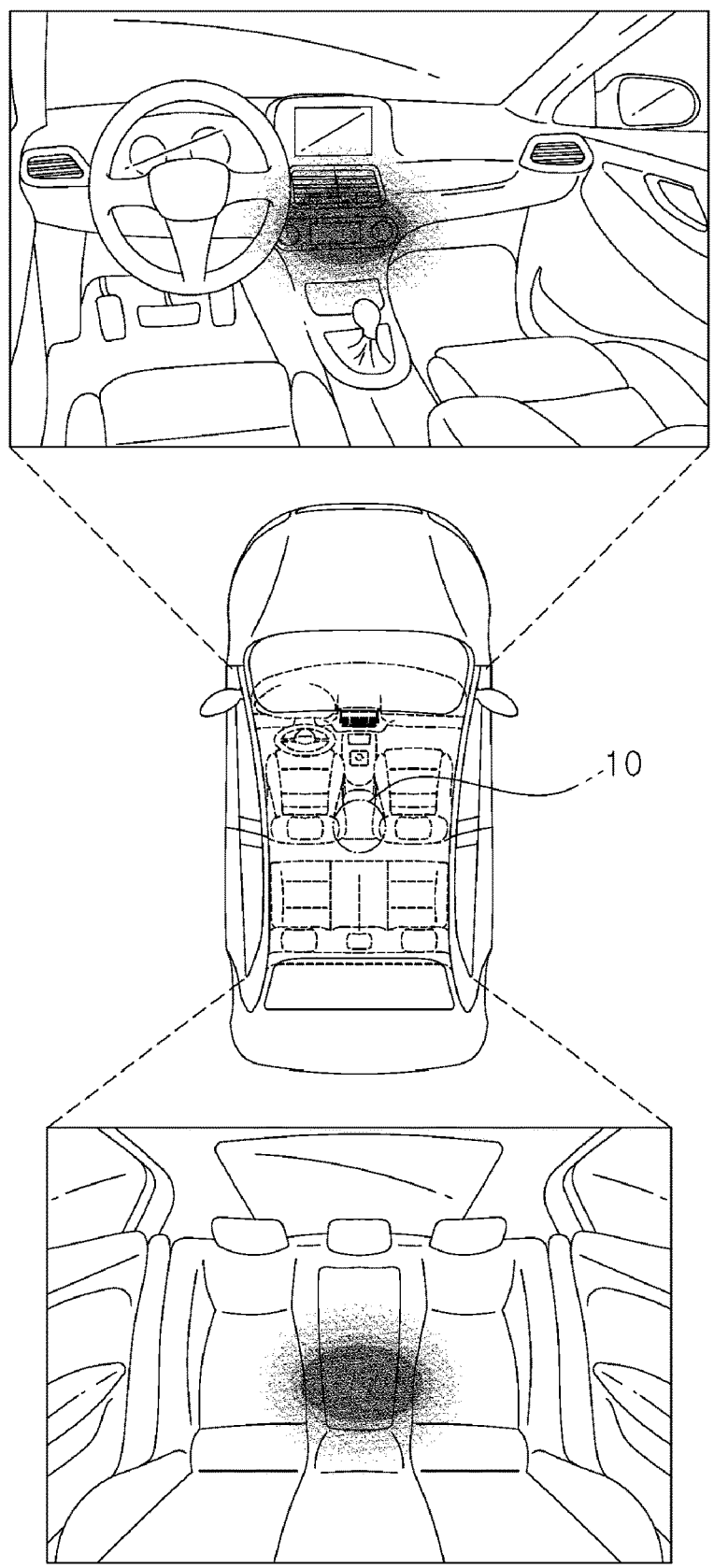
FIG. 1 is a conceptual diagram of a microphone applied to embodiments of the present disclosure.

FIG. 1 is a conceptual diagram of a microphone applied to embodiments of the present disclosure. The noise characteristic of an electric vehicle is that PE components are positioned in a front motor room and a rear trunk corresponding to an engine room of an internal combustion engine vehicle. In particular, in the case of a driving motor, a main motor and an auxiliary motor may be distinguished from each other, the main motor is positioned in the rear trunk together with a decelerator and an inverter, and the auxiliary motor is positioned in the front motor room. A microphone for measuring the noise generated from the PE components for the electric vehicle may be positioned at the center of the vehicle as shown in FIG. 1.

Since the position of the PE component is determined according to the vehicle type, the physical position of the motor, the decelerator, the inverter, and the relative position from the microphone are all the same when the vehicle type is determined.

Meanwhile, even when the microphone is not necessarily positioned at the center of the vehicle, the relative positions from the motor, the decelerator, and the inverter may be learned, and therefore, there is no reason to limit the position of the microphone to the center of the vehicle.

As a noise collection device, a plurality of microphones may be disposed in each direction to perform simultaneous measurement to be symmetrical to a front side toward the motor room and to a rear side toward the trunk. The microphone is composed of a plurality of channels, and at least three channels, preferably, five channels may be positioned on each of the front and rear of the vehicle. In addition, two channels may also be disposed in the upward direction in addition to the front and rear of the vehicle, and this is because the noise may be reflected and delivered from the ceiling of the vehicle in a process in which the noise is delivered and transmitted from the noise source into the vehicle interior.

From a time difference in which noise reaches from the noise source to the microphone with the plurality of channels, a position of the noise source or a position through which the noise is transmitted may be calculated and to this end, a calculation unit may be embedded or located in the vehicle.

The position of the noise source comprehensively means not only the positions of the motor, the inverter, and the decelerator, but also the position of a vulnerable portion of a shielding part for blocking the noise delivered from the positions of these noise sources into the vehicle interior, for example, a noise leak portion, and the position of this vulnerable portion may be referred to as a noise transmission position.

The microphone may be positioned at a central position 10 in a space of the vehicle interior that may be a middle position between the main motor and the auxiliary motor, and the plurality of microphones or the plurality of channels may also be disposed in a row to be parallel to each other in both directions toward the trunk and the motor room in a width direction of the vehicle.

Since the positions of the main motor, the auxiliary motor, the decelerator, and the inverter are disposed in the front-rear and left-right directions, the plurality of microphones may be disposed in the front-rear and left-right directions.

In addition, the noise from the ceiling or floor of the vehicle is mainly the reflected sound of the whine noise that the noise passes through the noise leak portion. To detect this, the microphone may be additionally disposed in the upward-downward direction.

Meanwhile, to visualize the results of measuring the noise sources, a camera may be positioned in the front/rear/upward/downward directions or a three-dimensional camera may be additionally positioned at the position of the microphone. To this end, both the camera and the microphone may be positioned in the form of the array, and the microphone may be positioned at the central position 10 in the space of the vehicle interior that may be the center position between the main motor and the auxiliary motor.

The conventional acoustic camera uses the microphone with 12 channels, while the microphone used in embodiments of the present disclosure may have 3 or 5 channels in each of the front and rear directions, that is, 6 or 10 channels in total, and additionally have 2 channels in the upward direction to measure the reflected noise from the ceiling. The microphone is mounted on the center of the vehicle interior, and a physically accurate position is not limited to the center of the vehicle interior.

Figure 2:
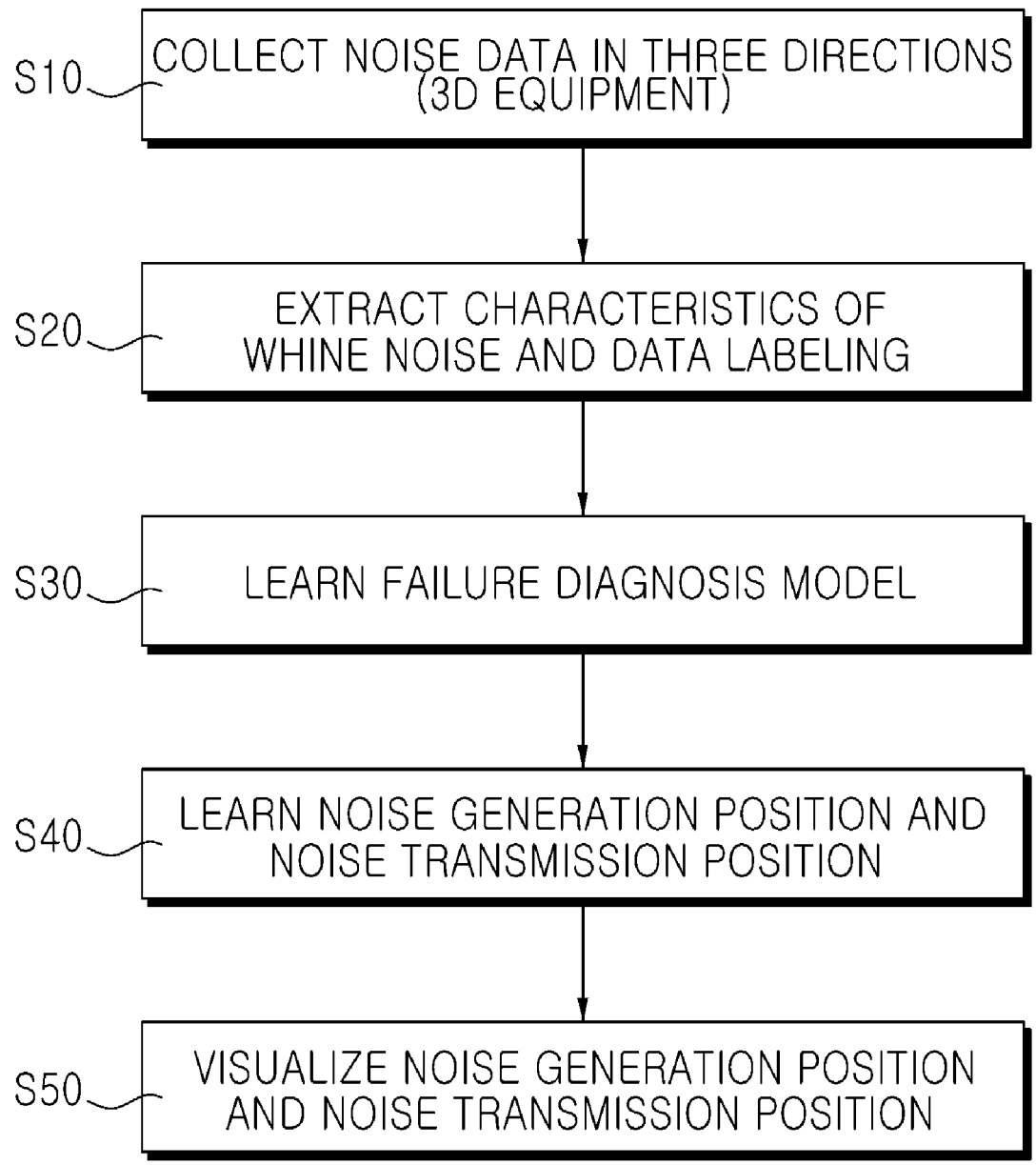
FIG. 2 is a block diagram showing a progress order of embodiments of the present disclosure.

FIG. 2 is a block diagram showing the order in which a process of determining whether PE components for the electric vehicle are failed by using a microphone and a camera is performed by a calculation unit.

A failure diagnosis refers to a diagnosis process of determining whether failure occurs from the noise generated by a failed component or a component estimated to be failed. In addition, a failure position refers to a position of a component estimated as failure from the noise.

First, there is a step of collecting noise data in the front-rear and upward directions from the microphone (S10).

In a step (S20), for the feature of the whine noise of the electric vehicle driven, which can confirm the physical states of the PE components, the characteristics of the noise analysis to confirm the physical meaning should be previously extracted in the step (S20).

According to the extracted characteristics of the noise analysis, in the step (S20), the processes of confirming the noise generation position as to which of the PE components is failed, the noise transmission position as to which position the whine noise caused by the leak is leaked from and performing the data labeling as to whether the PE components are failed precede. When the reflected sound from the ceiling of the vehicle in addition to the whine noise caused by the leak is measured, the data labeling should additionally precede by using a separate sound source measurement device therefor.

In the step (S20), by detecting characteristic frequency and order components of the whine noise depending upon the failure type to extract a feature vector such as frequency and order components depending upon the already secured failure type, the feature vector is reflected to a step of learning a diagnosis model in the step (S20). The type refers to a normal state and a failed state.

In the step (S20), a data set labeled for each type through the data labeling for the frequency and order components indicating the characteristics of the whine noise for each type is secured in advance.

In the step (S20), a classification model is used for data extraction and classification for the data labeling, and since the disclosure of the present application is not a disclosure for the classification model, a detailed description thereof will be omitted.

S30 is a step of learning the diagnosis model. For artificial intelligence learning, the data labeling and learning on the labeled data set are performed. The learning about the diagnosis model for each type in the step (S30) means collecting data through the microphone in the step (S10), extracting the feature vector from the information on the noise frequency and order components in the step (S20), and learning the whine noises of the PE components for the electric vehicle by the labeled data set.

Here, by extracting a magnitude, a phase, and a log Mel spectrogram through FFT to analyze the frequency characteristic of the electric vehicle noise, the order component of the noise caused by rotation is extracted. For example, there are an order N (Nth order) harmonic by the motor, an order M (Mth order) harmonic by the decelerator, etc.

In a step (S40), the failure diagnosis model is generated through the aforementioned learning in the step (S30), and then a learning model to estimate the noise generation position and the noise transmission position is sequentially applied to the failure diagnosis model.

The noise generation position refers to the position of the noise source.

The noise transmission position refers to a random position vulnerable to the noise positioned between the noise generation position where the noise is introduced into the vehicle through the portion or position vulnerable to the noise from the noise generation position and the vehicle interior.

The noise reflection position refers to a position where the noise introduced into the vehicle interior from the noise source or the noise transmission position is reflected by the ceiling or the floor of the vehicle.

By additionally, sequentially applying the learning model for estimating the noise generation position and the noise transmission position to the failure diagnosis learning model, it is possible not only to find the path where the whine noise flows into the vehicle interior, but also to determine whether the PE components are normal or abnormal as a result of the learning model.

The sequential application means that the estimation of the failure position is sequentially performed after the failure diagnosis model is learned because it should be determined after the failure diagnosis precedes. An algorithm will be described again in FIG. 4.

A step (S50) as a final step is a step of visualizing the generation and transmission positions of the high-frequency whine noises of the PE components for the electric vehicle. For visualization, by positioning cameras in the front and rear directions and implementing the position of the noise source or the noise transmission position identified through the microphone by the images of the camera, the position where the noise is generated is shown. To show the noise reflected through the ceiling of the vehicle, it is necessary to additionally position a camera in the upward direction like the microphone positioned in the upward direction. In other words, the step (S50) performs visualization to show more clearly the failure position about which of the PE components is the source of the whine noise and where the source of the whine noise is positioned as well as the position of the leak where the whine noise estimated or determined in the step (S40) is leaked.

Therefore, it is possible to finally present whether the whine noise is at a normal level or an abnormal level through the diagnosis result of the whine noise for each type of failure of the PE components for the electric vehicle together with the visualization.

Figure 3:
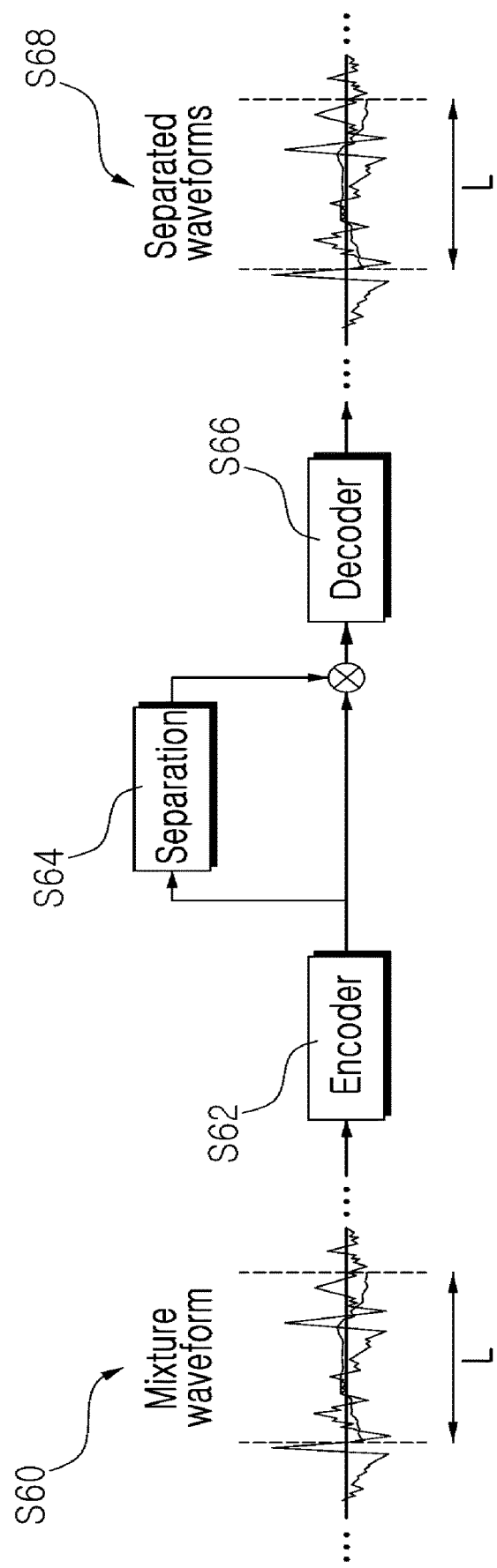
FIG. 3 shows a feature extraction algorithm for estimating a noise generation position and a noise transmission position in embodiments of the present disclosure.

FIG. 3 is a TasNet block diagram, which is a noise separation technique for improving high-frequency whine noise diagnosis performance of the PE components for the electric vehicle and is an algorithm applicable to remove the noise mixed in the collected noise data.

A step (S60) is a step of inputting an input signal of a mixture waveform whose length is L, and all noise data (raw data set) flowing into the vehicle interior may include not only the whine noises from the motor/decelerator/inverter, which are the PE components, but also vehicle load noise, wind noise, and other background noises.

A step (S62) as a step of encoding the collected data is a step of extracting data images by compressing the collected data in the form applicable to a noise source separation model.

A step (S64) is a step of extracting and separating the data having the characteristics other than the whine noise from the data introduced from the step (S62) based on the characteristics of the whine noise as the noise source separation model.

When the data other than the whine noise is separated from the whine noise data through the noise source separation model from the steps (S62, S64), a step (S66) is a step of decoding and converting the data back into the noise with the physical characteristics.

A step (S68) is a step of extracting only the data of the whine component necessary for the learning model applied from the step (S10) to the step (S50) described above and corresponds to a kind of a whine noise extraction filter, and the high-frequency noise is separated from the mixture waveform.

It may be confirmed that the mixture waveform in the step (S60) is separated up and down and extracted in the step (S68). In other words, when the separated noise sound source exists, it is possible to separate the sound source by using the latest deep learning models such as Conv-TasNet based on temporal convolutional network (TCBN) and SepFormer based on Transformer.

Figure 4:
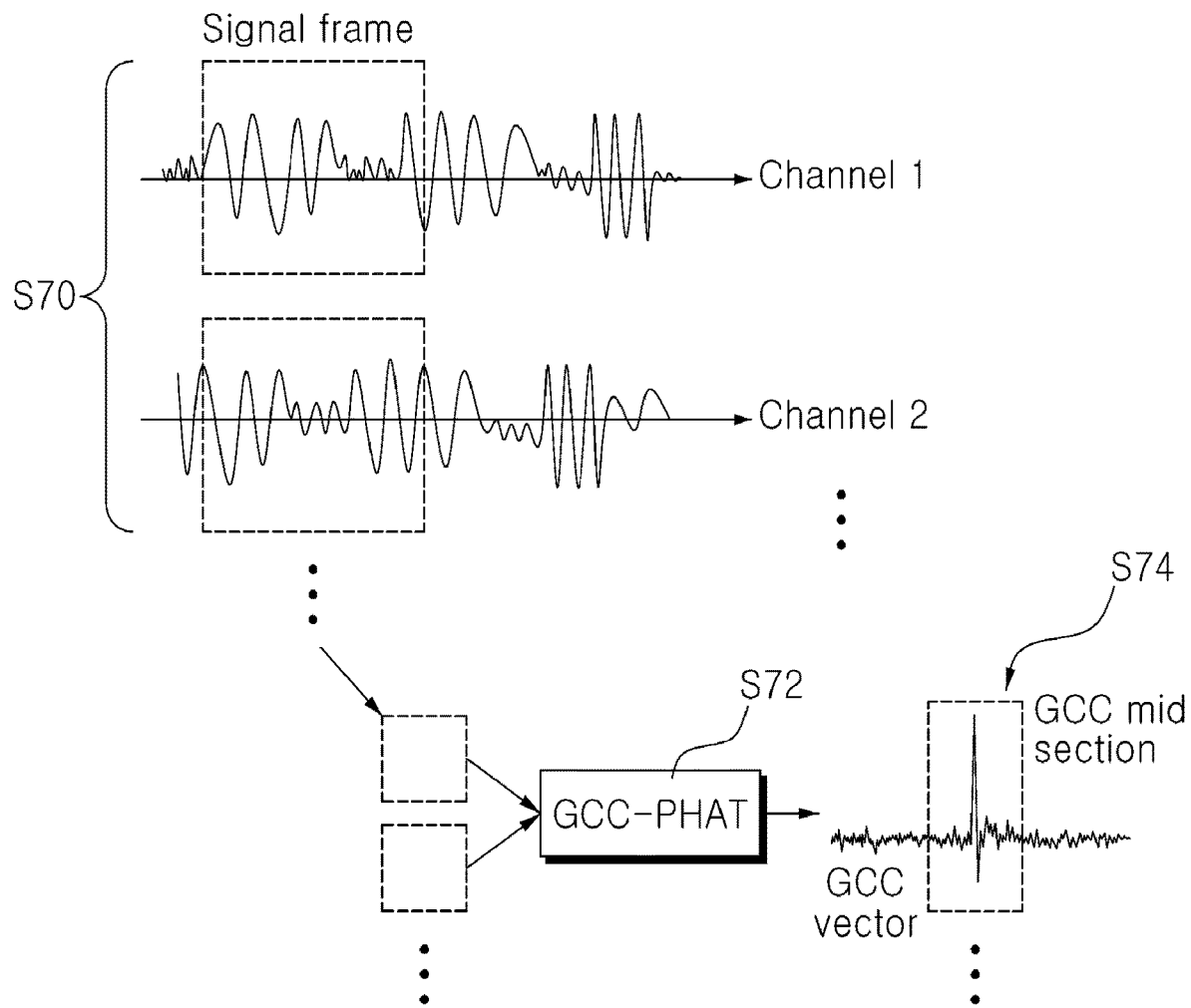
FIG. 4 shows a whine noise separation algorithm applied to embodiments of the present disclosure.

FIG. 4 shows a process of extracting the characteristics necessary for estimating the noise generation positions of the PE components for the electric vehicle. In a step (S70), a noise signal is input from two or more channels.

When the same frame is set in the same time domain, in a step (S72), a failure position estimation feature vector may be extracted by applying generalized cross correlation-phase transform (GCC-PHAT) to calculate the time difference. In the step (S74), the GCC-PHAT is a voice position tracking technique algorithm capable of knowing the noise generation position when there are two or more microphones.

According to embodiments of the present disclosure, it is possible to multi-track the accurate position of the source by estimating the space (position) how far the source is generated from at least 3 channels, preferably, 5 channels through the time estimation by using the time difference delivered from the plurality of noise sources within the front and rear 2D areas or the front 2D area and the rear 2D area from the determined noise measurement position. Actually, it is possible to identify the plurality of noise generation positions more accurately by using at least 3 channels, preferably, 5 channels from the time difference of each of the plurality of microphones disposed laterally in the width direction of the vehicle to be parallel in a row toward the motor room and the trunk.

What is claimed is:

1. An artificial intelligence (AI) based apparatus for diagnosing noise generation of power electric (PE) components for an electric vehicle, comprising:
    a plurality of microphones disposed in a vehicle interior; and
    a calculation unit collecting and calculating noise data measured by the microphones,
    wherein the microphones acquire the noise data generated from any one or more of the PE components, and
    wherein the calculation unit performs artificial intelligence learning for diagnosing failures and estimating a noise generation position and a noise transmission position to identify a position of the noise source and a noise leak portion.

2. The apparatus of claim 1, wherein the PE components comprise a main motor, a decelerator, and an inverter positioned in a rear trunk, an auxiliary motor positioned in a front motor room.

3. The apparatus of claim 1, wherein the same number of microphones is positioned in front and rear directions to estimate the position of the noise generation position and the noise transmission position.

4. The apparatus of claim 3, wherein two or more microphones are additionally positioned in an upward direction to calculate a time difference at which the noises transmitted into the vehicle from the noise sources are delivered.

5. The apparatus of claim 3, wherein a camera is positioned in the front and rear directions together with the microphones to visualize front and rear noise sources by the microphones.

6. The AI-based noise generation diagnosis apparatus of claim 3,
    wherein the microphones are additionally positioned in an upward direction, and the camera is also additionally positioned in the upward direction.

7. An artificial intelligence (AI) based method of diagnosing noise generation of power electric (PE) components for an electric vehicle, comprising:
    collecting noise data in front and rear directions from a plurality of microphones disposed in a vehicle interior;
    extracting a feature vector of the noise data and preparing a data set labeled through data labeling;
    performing, by a calculation unit, learning of a failure diagnosis model from the extracted feature vector and the labeled data set;
    performing, by the calculation unit, learning estimating a noise generation position and a noise transmission position in addition to the failure diagnosis model; and
    visualizing the noise generation position and the noise transmission position from image data acquired by a camera positioned in the front and rear directions together with the microphones.

8. The method of claim 7, wherein the PE components comprise a main motor, a decelerator, and an inverter positioned in a rear trunk, an auxiliary motor positioned in a front motor room, or a combination thereof.

9. The method of claim 7, wherein in the step of collecting of the noise data, the microphones are additionally positioned in an upward direction together with the microphones.

10. The method of claim 7, wherein in the step of visualizing from the data, the camera is additionally positioned in an upward direction together with the microphones.

11. The method of claim 7, wherein whine noise is separated by applying Cony-TASNet based on TCN and SepFormer model based on Transformer to the noise data measured by the microphones.

12. The method of claim 11, wherein the step of extracting of the feature vector of the whine noise extracts and classifies an order component of the whine noise from any one or more noise sources among the PE component measured by the microphones.

13. The method of claim 7, wherein the step of performing of the learning estimating the noise generation position and the noise transmission position performs learning about the noise data from any one or more of the PE components and the failure diagnosis, the noise generation position, and the noise transmission position from the normality/abnormality determination results for each noise data.

14. The method of claim 7, wherein the step of estimating of the failure position extracts a failure position estimation feature vector as a model applying generalized cross correlation-phase transform (GCC-PHAT) by using a time difference calculation at which the noises collected by each of the microphones are delivered.

* * * * *